United States Patent [19]

Halfter

[11] Patent Number: 5,616,163
[45] Date of Patent: Apr. 1, 1997

[54] METHOD FOR PROCESSING ANIMAL EXCREMENT AND LIQUID MANURE

[76] Inventor: Georg Halfter, 7889 Grenzach-Wyhlen, Grenzach-Wyhlen, Germany

[21] Appl. No.: 421,466

[22] Filed: Apr. 12, 1995

Related U.S. Application Data

[63] Continuation of Ser. No. 64,171, filed as PCT/EP92/02122, Sep. 16, 1992, abandoned.

[30] Foreign Application Priority Data

Sep. 20, 1991 [DE] Germany .................. 41 31 296.1

[51] Int. Cl.$^6$ ...................................... C05F 3/00
[52] U.S. Cl. ................................ 71/15; 423/358
[58] Field of Search ................. 423/358; 422/5; 71/12–22

[56] References Cited

U.S. PATENT DOCUMENTS 4,872,998  10/1989  Dausman et al. ............... 210/710
5,071,622  12/1991  Dunson, Jr. ..................... 422/5

FOREIGN PATENT DOCUMENTS 4119504  12/1992  Germany ..................... 71/63

*Primary Examiner*—Ferris Lander
*Attorney, Agent, or Firm*—Blakely, Sokoloff, Taylor & Zafman

[57] ABSTRACT

Method for the processing of animal excrements and liquid manure—called liquid materials—for the purpose of utilization of the ammonia contained in the liquid materials as a chemically bound non fugitive plant fertilizer, as well as the thermal disposal of the chemical unreactive, environmental hazardous ingredients of the liquid materials, respectively of the residues remaining from the processing like ammonia residues, methane gas or gaseous odorous compounds, for example of the skatole—or mercaptan type, wherein said the ammonia unbound and/or solubilized in the liquid materials is transformed into a non fugitive, easy resorbable nitrogen fertilizer for plants by adding carbon dioxide and gypsum to the liquid materials and using stable exhaust as preferred carbon dioxide source and the liquid materials are generally purified by the striping method from the odorous substances, ammonia residues or, from the stable exhaust originating methane by feeding in air or especially stable exhaust and which are combusted thermally catalytically or supported by a fuel gas, when they leave the installation.

8 Claims, 2 Drawing Sheets

METHOD FOR PROCESSING ANIMAL EXCREMENT AND LIQUID MANURE

This is a continuation of application Ser. No. 08/064,171, filed as PCT/EP92/02122 on Sep. 16, 1992, and now abandoned.

The present invention relates to a method and an installation for the processing of animal excrements and liquid manure, summarized further under the notion "liquid materials", for the purpose of binding and transforming the nitrogen compounds contained in the liquid materials, mainly ammonia into an easily absorbable plant fertilizer, as well as for the purpose of reducing unpleasant odorous compounds contained in the liquid material.

Furthermore the inventive method relates simultaneously to a solution of the problem for processing and improvement of stable exhaust.

Following an intensification of stock farming more liquid materials and stable exhausts are produced that can lead to a considerable damage of the environment and to an over proportional rise in the production costs of agricultural stock farming. The liquid materials are usually collected and stored in containers (for example cesspits), made from different materials (for example, steel, plastic, wood, concrete)-today they are mostly made from local concrete. To those count also containers of biogas devices, which contain degassed liquid manure. Actually the stable exhaust of common stock farming is emitted almost exclusively into the environment and is therefore causing emissions.

However, if the stable exhaust is cleaned without using the ammonia—and also the carbon dioxide—respectively the methane content, the technique to be inset is causing costs and results in higher production costs to the management of such plants. Periodically, the container of the liquid materials are emptied, mostly depending on the weather and the volume of the container. This follows either using tank trucks or tanks situated on trucks or directly using pumps and pipes, so called pipelines, with which the liquid materials are distributed mainly on useful areas like agricultural soil and greenland. The distribution of the liquid materials follows frequently with the use of central distributors, for example baffle plates, pendulum pipes, sprinkler systems or decentralized distribution devices, where the substances to be distributed come in contact with the atmospheric air and are polluting it with odorous substances and ammonia.

The distribution of the liquid materials follows an old tradition because they contain precious plant nutrients like nitrogen, phosphorous and sodium compounds.

Therefore the natural fertilizer contained in the liquid materials, especially in form of nitrogen compounds, is from an economical view a material of value, which otherwise has to be produced chemically.

Synthetic nitrogen fertilizers are exclusively produced on the raw material basis of the nitrogen content of atmospheric air. Because air contains only 80% of nitrogen, the oxygen portion of 20% has to be separated. This is done using the so called Linde method, mainly however by combusting the oxygen to carbon monoxide or carbon dioxide, because the oxygen required as byproduct of the Linde method is limited.

For binding, respectively combusting the oxygen portion of the air, at least 1 kg carbon like natural gas, mineral oil, or coal is needed to produce 1 kg nitrogen. If no coupling products are produced for the utilization of carbon monoxide, large amounts of carbonic acid are produced, that are released into the atmosphere, which is according to reports responsible for the global warming effect. Therefore, it is even more important to destroy the nitrogen content of the animal excrements in the liquid materials and stable exhaust, but also, according to the inventive task, to transduce it into a form that the nitrogen can be used almost completely as a natural fertilizer.

It should be considered, that in different parts of the world the natural fertilizers made from animal and also human excrements are often the only available fertilizers, due to economical reasons.

With the above described way spreading unprocessed liquid material on the soil 80% to 90% of the nitrogen content gets lost.

The major portion escapes into the atmosphere as unbound nitrogen like ammonia. In part, directly during the distribution of the liquid materials using the spraying method, partly relatively short after the distribution of the liquid materials depending on the condition of climate and soil. The same counts for the extremely bad smelling compounds of the skatole and mercaptan type, which are contained in the liquid materials.

The latter hardly react chemically and therefore can not be bound chemically and separated using a simple procedure.

A further environmental problem caused by stock farming is the secretion of methane gas, especially from the cattle species, and generally from ruminants.

Methane gas has a 30% higher ozone endangering potential than carbonic acid. For methane gas anyway burdens the environment, especially by fermentation processes of waste disposals without disposal gas utilization and the generally known marsh gas that originates from regions with rice cultivation and swamp fields, as well as sewer gas from mud depositions of less ventilated, motionless inland waters, it is therefore by far more important to resolve the problem at least partially.

It is therefore the task of the invention to resolve all above cited problems related to stock farming, ideally using one combined method.

It is irresponsible from the above described case to resolve the problem caused by animal excrements, liquid manure and stable exhaust in a sense of destruction of the precious compounds without taking any profit from it.

Even the destruction of the annoying compounds is not environmental friendly, for also chemical and biological transformation processes do not inherit a perpetuum mobile.

The expert use is therefore of greater importance with regard to the disposal of the liquid materials;

a) in their processed form b) and that the processed liquid materials are evenly distributed on the cultivated soil in such a concentration per area unit, that it ranges within the absorption capability of plants and vegetation and of the biological-bacterial degradation capability of the soil.

If the unprocessed liquid materials are sprayed on the soil near residential areas, health impairing problems of the residents may be the result. In those emission areas mucous membrane infections, headaches, sleeping disorders and allergies were reported. In majority the gaseous and the so-called free, unbound compounds of the liquid materials are responsible for the impairment of the environment. Above all belong to them ammonia, as well as the odorous substances of the skatole type that result from protein degradation processes and organic sulfur compounds of the mercaptan type.

Especially ammonia is supposed to have a high health impairing and tree damaging risk, whereas the intensive smelling odorous substances are more likely present in low concentrations in the liquid materials. The odorous intensity, especially of the mercaptans is remarkably strong, one can sense the odor even in the ppm range and also in a 1000-fold lower concentration range.

Apart from the health relevant effects caused by emissions of the liquid materials, it is reported more often that the atmosphere and their higher levels may be contaminated by the gaseous compounds of the liquid materials and of the stable exhaust. The same is true in much worse form for the methane, which arises from the cattle stock farming.

Obviously the ozone layer is impaired, especially that part of the ozone layer 20–50 km high above the surface of the earth, that acts like a protecting shield absorbing the dangerous ultraviolet radiation of the sunlight.

It has to be mentioned, that the problem concerning methane as emission gas from stock farming has been totally neglected so far. However if one considers that worldwide, billions of ruminants exist, while each cattle for example is releasing more than 200 l methane daily, it is easy to calculate that the resulting sum of methane produced in total is very considerable. An absolute solution of this problem is hardly imaginable. However, a reduction of the methane gas volume produced would be already a very considerable success, if this could be achieved by a simple, realizable method.

Therefore, the task of the invention is to find a method and a device to free the liquid materials from the fugitive and chemically unbound compounds, or to reduce their concentration in the liquid materials considerably in the way, that these compounds are bound preferably, and that the nitrogen compounds, especially ammonia are transformed into a nitrogen fertilizer, which can easily be absorbed by plants, and that the excess of process gas is thermally destroyed, or that only a thermally disposal is done, according to a simplified version.

It is a further task of the invention to reduce emissions by stable exhaust, respectively their odorous substances and methane gas content, if referred to the cattle respectively ruminant stock farming, as well as to use the unbound ammonia, if possible simultaneously in one single procedure with the processing of the liquid materials.

Surprisingly, the solution of the problem was achieved by the present new method and installation for the processing of animal excrements and liquid manure—called liquid materials—in order to profit from the ammonia content of the liquid materials as a chemically bound, nonfugitive plant fertilizer, as well as to destroy thermally the unreactive, environmentally damaging compounds of the liquid materials, respectively the residual substances from the reaction course, like ammonia, methane gas or gaseous odorous substances of the skatole or mercaptan type, wherein said the unbound and/or soluble ammonia contained in the liquid materials is transformed into a nonfugitive nitrogen fertilizer, easy absorbable by plants, by adding carbon dioxide and gypsum to the liquid materials, and that stable exhaust is preferably used as carbon dioxide source, and that the liquid materials are generally relieved, using a striping method, from the odorous substances, ammonia residues, methane resulting from stable exhaust and further fugitive substances, by infusing oxygen, preferably in form of air or especially stable exhaust and that the gases leaving the installation are combusted thermocatalytic or with the help of a fuel gas.

In a simplified version of the method for the processing of the liquid materials the treatment with gypsum is dropped and only the striping method using oxygen, respectively air or preferably stable exhaust is carried out according to the device in FIG. 2.

This seems to be the preferred method in cases where the amount of liquid material to be processed is so small that the complete process expenditure is not justified. In cases of small mobile units for the processing of the liquid materials the simplified version of claim 2 might be preferred.

The processing of the liquid materials by adding suspended gypsum is done best with the use of precipitated gypsum, that is produced for example at the flue gas desulfurization.

The solid matter content of gypsum should amount 5 to 25% in the suspension, while due to reasons of the reaction kinetics, higher gypsum concentrations are more advantageous. However, most useful is a gypsum concentration between 10 and 20% in the suspension, because the gypsum is easier to disperse in water and a trouble-free dosage of the gypsum suspension into the preparation device is possible.

The location of the gypsum dosage addition is also of importance. This is arranged in a way, that the liquid materials to be processed meet a high surplus of gypsum according to the equivalent requirement of the chemical transduction of ammonia to ammonium sulfate. This is of particular importance, for the method runs at room temperature and therefore no energy supply is necessary, which again indicates the method as environmentally friendly. The dosage of the gypsum suspension is therefore preferably carried out via the inlet pipe of the liquid material pump 1. This has the additional advantage that simultaneously an intensive mixing of the reacting substances occurs in the eccentric screw pump. For the body of the pump consists largely out of aggression- and abrasion resistant elastomeric material, a possible weak point of the material is therefore ruled out.

Many efforts have been undertaken for resolving the inventive task. In DE-PS 37 12 788 a method adjusting the calcium requirement at the fertilization with liquid manure is described, where dolomite is added to the liquid manure as a calcium donor, only if the soil has a calcium deficiency. For dolomite reacts neutral to alkaline and is almost water insoluble, the reactivity is neglectable compared to the also alkaline reacting ammonia.

Considering the device cited in this method, a considerable expenditure of analytical measurements for the controlled run is required.

In "Müll und Abfall" 20, (1988) 469–472, a method is described for eliminating ammonia from disposal seepage water by chemical precipitation as magnesium-ammonium sulfate, which could also be used for the precipitation of ammonia in liquid manure. Besides, that the total elimination of ammonia is not necessary at all, the procedure is too apparatus intensive for the use in a medium sized agricultural plant. Beyond that, the farmer would have to acquire some knowledge in chemistry and industrial processing engineering to guarantee a rational reaction run.

However, the present new method works relatively uncomplicated in its simplest version, only by adding oxygen or air, preferably stable exhaust and a supporting fuel gas like propane, butane, natural gas or similar ones. The required installation is also relatively uncomplicated and does not need any chemical analytical data recording.

The full step processing of the liquid materials and of the stable exhaust is based, according to the inventive method, on binding the solubilized ammonia, respectively the slightly chemically bound ammonia and other alkaline reacting ingredients, with the use of gypsum to ammonium sulfate, according to the formula $$CaSO_4 + 2NH_3 + CO_2 + H_2O \rightarrow CaCO_3 + (NH_4)_2SO_4$$

The $CaSO_4$ is fed into the process as a dispersion. Gypsum from industrial flue gas desulfurization can be used as an inexpensive raw material. From that point of view, the inventive method proves to be environmentally relieving in two respects, for ammonia is bound and on the other hand an environmental waste product can be recycled.

A moderate flow of carbon dioxide is necessary as reaction medium beside $CaSO_4$. Usually, the carbon dioxide concentration of the stable air, which amounts to 4%, is sufficient. If this exhaust is not available carbonic acid is used from steel bottles.

Advantageously, the $CaSO_4$ is fed into the process without dispersion aid as a so-called suspension. Suitable is a gypsum concentration of 15% in the suspension, referred to 100 parts per weight of the aqueous mass. However, gypsum concentrations between 10% and 30% are within the range of use.

The reaction runs already at a temperature of ca. 30° C. If the temperature is remarkably lower, this disadvantage can be compensated for by increasing the gypsum concentration of the gypsum suspension.

However, no special temperature control is required.

However, if the present method is supposed to be used in a large technical range, where economical evaluations require a rapid run of the process, then the energy resulting from the combustion of the waste gas from this method, the flaring of the remaining gases to be combusted together with the necessary supporting fuel gas can be used for that.

The location of gypsum dosage into the processing apparatus is of special importance, with respect to the above cited increase of the gypsum concentration in the gypsum suspension and the concentrated dosage of gypsum into the liquid materials.

This is arranged in that way, that the liquid materials to be processed meet a high excess of gypsum, with respect to the equivalent requirement of the chemical transformation from ammonia to ammonium sulfate, according to the above cited chemical formula. Preferably, the location of gypsum dosage is directly at the intake stack for the liquid materials of the eccentric screw pump 1.

Beyond that, this dosage location has the advantage that an intensive mixing of the reaction partners, liquid material and the gypsum, occurs immediately within the eccentric screw pump 1. For the carbonic acid from the stable exhaust is fed into the installation alternatively above the eccentric screw pump, the reaction can run off completely according to the above cited chemical formula.

The role of the eccentric screw pump as prereactor is also very important for further reasons.

The mixing zones of chemical procedures are generally zones of intensive wear, caused by turbulence of flow, abrasion, chemical corrosion and similar effects. For the mixing of the reaction partners takes place within the eccentric screw pump, which pump body is made largely out of an aggression stable and abrasion resistant elastomeric material, a potential weak point of the material is ruled out.

Naturally, the gypsum used is the usual calcium sulfate hydrate, $CaSO_4 \cdot 6 H_2O$.

Calcium carbonate, another product next to ammonium sulfate is also a useful plant nutrition. Calcium carbonate in its precipitated form acts as a long-term fertilizer, which at the same time neutralizes the slightly acid reacting ammonium sulfate.

After the precipitation of the ammonia with gypsum follows the degassing of the liquid materials and the combustion of the respective gases at the same time and/or simultaneously. Furthermore, the methane gas originating from the stable exhaust of cattle stock farming is combusted. For the concentration of combustible gas resulting from the degassing of the liquid material is too low, another combustible gas the so-called supporting fuel gas, has to support the combustion. Supporting fuel gases are natural gas, propane or butane.

The combustion of the process gases has to be carried out that way, so that especially the combustion of the nitrogen compounds and the odorous substances is guaranteed. Ammonia can be combusted partially, however nitric oxides are the resulting combustion products. The present case displays the total combustion, because it requires a lower oxygen supply than the partial combustion. The combustion of ammonia is exemplified according to the following formula:

$$4 NH_3 + 3 O_2 = 2 N_2 + 6 H_2O$$

The above cited combustion reaction of ammonia produces 302 kcal. For methane, that displays an even higher caloric value is combusted together with the exhaust gas mixture, the respective energy value is considerable. This energy contained in the combustion exhaust can be utilized with a heat exchanger, for example, for warm water preparation.

Naturally, the exhaust combustion can also be carried out catalytically using tempered catalyst nets or catalyst filters similar to the Otto carburetor engine exhaust catalysts.

However, which procedure of the termal disposal is more favorable, depends on the amount of combustible gas in the individual case.

Therefore, it has to be decided for each individual case, which combustion method of the process exhaust is preferred.

The inventive method is carried out as described by the following examples, however it is not restricted to these examples. Measuring and control technical devices are not described in detail.

To run the inventive method in an optimized way, simple, commercially available measuring—and technical control devices should be used. For example ion-sensitive electrodes should be used for pH measurements and for measurements of the $NH_3-$, $CO_2-$, and Ca—concentrations.

The inventive method bears the following advantages.

General advantages:
normal distribution devices (baffle plates, nozzle arms, sprinkler systems) can be set in, that lead to a reduction of costs,
high area efficiency is possible,
distribution is possible at good conditions of weather and soil, therefore lesser damage of soil and plants, the liquid manure is more worth the transportation because of a higher plant usable N-content, transformation of the gypsum that is not usable for fertilizing purposes.

low variable costs due to low costs of the reaction compounds.

Advantages of a mobile installation set in after the pile container:

customary stock farming systems can be continued, no transportation of the liquid manure for preparation purposes (to industrial plants), low fixed expenditures.

Stationary installation using stable exhaust:

higher value of the liquid manure by enrichment with N from the stable exhaust, therefore the liquid manure is worth the transportation (ammonium sulfate content rises by ca. 100%), the ordorous emissions are removed from stable exhaust, therefore closer distances between stables and residential areas are possible, the central collection of stable exhaust allows the installation of heat regenerating devices without special expenditures, due to the binding of N, container covers for the liquid manure container may not be necessary (saves costs), low variable costs by using the carbon dioxide from the stable exhaust.

Some advantages have also indirect effects, due to continuous efforts to reduce emissions and the odorous annoyance of stock farming. Some measures for the customary reduction of odor of liquid manure are for example:

Stable:

chemical supplements large distances from residential areas

Storage:

ventilation (unsatisfactory)

container coverage (expensive)

chemical supplements to the liquid manure production of biogas (high expenditures)

Distribution:

devices for drilling the liquid manure into soil (technically and energetically expensive, only limited use)

Diminution of emissions in stable exhaust:

rinsing the walkways with water biowasher with bacterial cultures concentration changes

EXAMPLE 1

Figure 1:
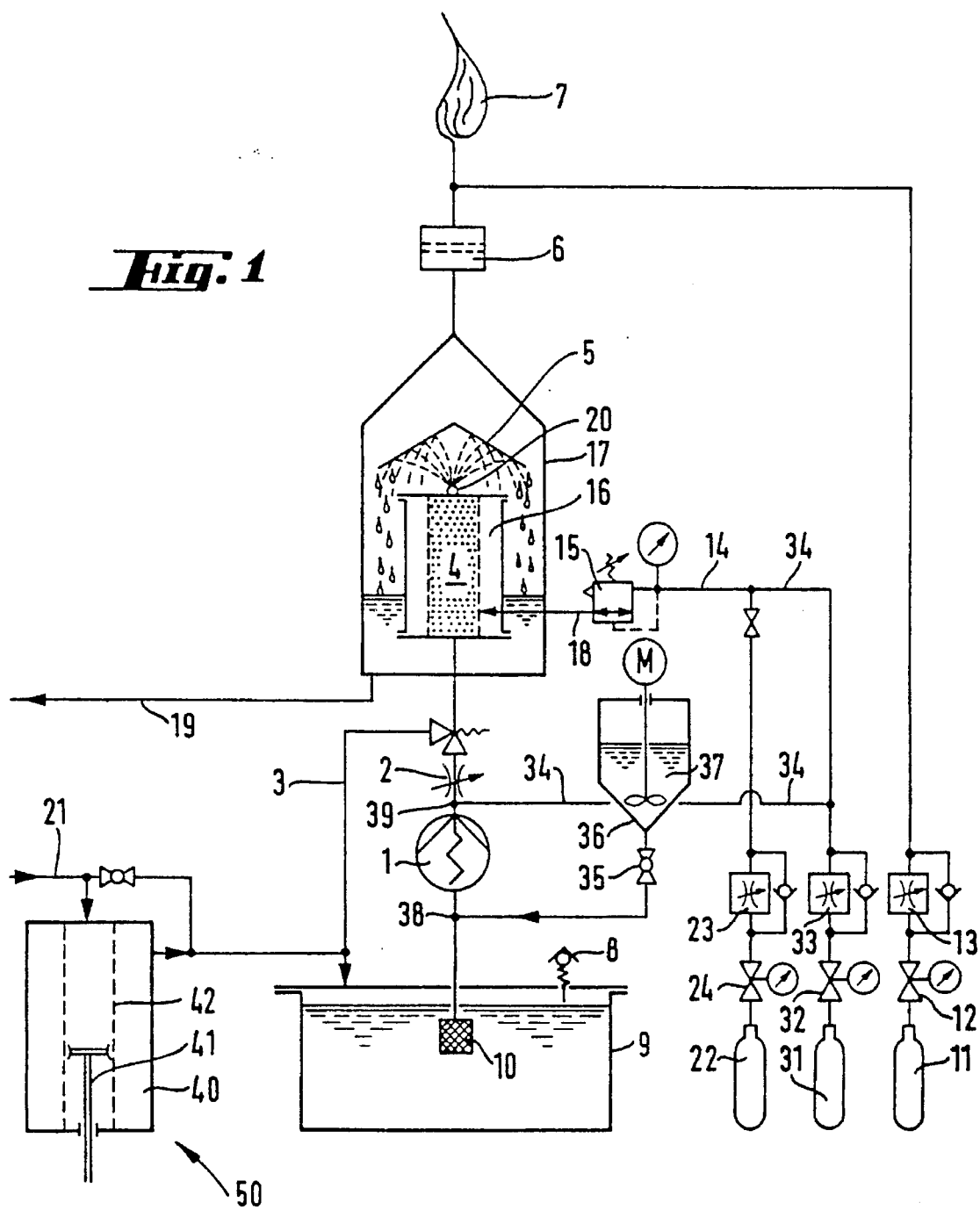
FIG. 1 is a schematic illustration of a preferred embodiment for producing chemically bound, nonfugative fertilizer.

Method of FIG. 1

The liquid material is pumped via intake stack with self cleaning filter 10 from the pile container 9 by the eccentric screw pump 1 over the pressure-/volume regulation 2 and the security overflow 3 into the mixing cylinder 4 of the reactor 17. If the amount of pumped liquid material is regulated by the revolution number of the eccentric screw pump 1, the volume regulation 2 can be dropped. Oxygen, air, preferably however stock farming exhaust are fed via inlet pipe 18 in form of fine dispersed bubbles through the porous body 16 into mixing cylinder 4. The porous body 16 is composed out of ceramics or plastic, like polyethylene, polypropylene, polyamide or similar plastic raw materials. It is a tube like hollow body with a closed outer wall, an open inner wall and fine porous, respectively capillary filled body material. This kind of material automatically leads to a fine dispersed air infusion into mixing cylinder 4, required for this method. On the other hand, the porous body saves an otherwise necessary inlet nozzle.

Alternatively and/or additionally the oxygen (air) can also directly infused on the pressure side of the eccentric screw pump, that further extends the reaction way of the liquid materials and the gypsum suspension mixture. Outlet pipe 20 of the mixing cylinder 4 is amply dimensioned the way, that no pressure can arise in the mixing cylinder, which means that the infusion of air in the mixing cylinder causes a partial vapor pressure reduction in the reaction medium. This facilitates the degassing of the liquid materials.

The oxygen, respectively the oxygen content of the air fed into the mixing cylinder causes a mild oxidative effect, respectively an activation of bacterial degradation processes. This also causes partially a deodoration of the liquid materials.

Simultaneously with the onset of the oxygen-(air)-infusion, a 10% gypsum suspension 37 is pumped from the mixing container 36 via dosage device 35 into the liquid materials at the height of the intake stack of the eccentric screw pump 38. The dosage of the gypsum suspension follows a volume per time ratio, for example 100 l per hour. For the mixing container 36 is supplemented with a stirrer driven by motor M, the suspension always stays in good fluid conditions and flows to the location of dosage by its own gravity.

On the other hand the eccentric screw pump causes a suction effect. To guarantee a completely regular feeding of the gypsum suspension, the use of a small dosage pump is suitable. In such a case the revolution numbers of both pumps, eccentric screw pump 1 and the gypsum suspension pump can be adjusted with each other that way, that the use of the inset material is optimized in an economical view. If stable exhaust is used as air supply the carbon dioxide required for the binding of the ammonia is already present. If this is not the case, carbon dioxide has to be used from another source, for example from a steel bottle or tank 31, via valve 32 and the dosage regulation 33 with the inlets 34. It is advantageous to feed the carbon dioxide into the system at point 39, above the eccentric screw pump. That leads to a particular intensive mixing of the reaction medium and the duration time of contact is prolonged.

Another carbonic acid source has to be mentioned, which is of interest for application on fields, that is the recycling of exhaust fumes from Diesel generating engines, that can cover up one third of the carbon dioxide requirement.

After the reaction medium has passed mixing cylinder 4, the processed liquid materials leave the main location of reaction via outlet pipe 20.

A separation of the liquid materials from the gaseous compounds, as well as from the before infused gases, like oxygen of the air, methane, carbon dioxide, unreacted ammonia, as well as from the unbound residual odorous substances, occurs at the baffle plate 5.

The gaseous compounds are combusted at flame 7, after passing a flame filter (flame backdraft prevention) 6 and the dosage of a supporting fuel gas at point 45, via pipe 46, gas volume regulation 13, valve 12 and source of supporting fuel gas 11.

The processed liquid materials 19 leave reactor 17 descending by their gravity and are stored interim in a container or distributed directly on the soil to be fertilized by spraying containers or pipes. Further side- or waste products are not produced.

Alternatively, the combustion of the gaseous process exhaust can be carried out catalytically without flame formation, or thermocatalytically at a respectively tempered catalyst device.

EXAMPLE 2

Figure 2:
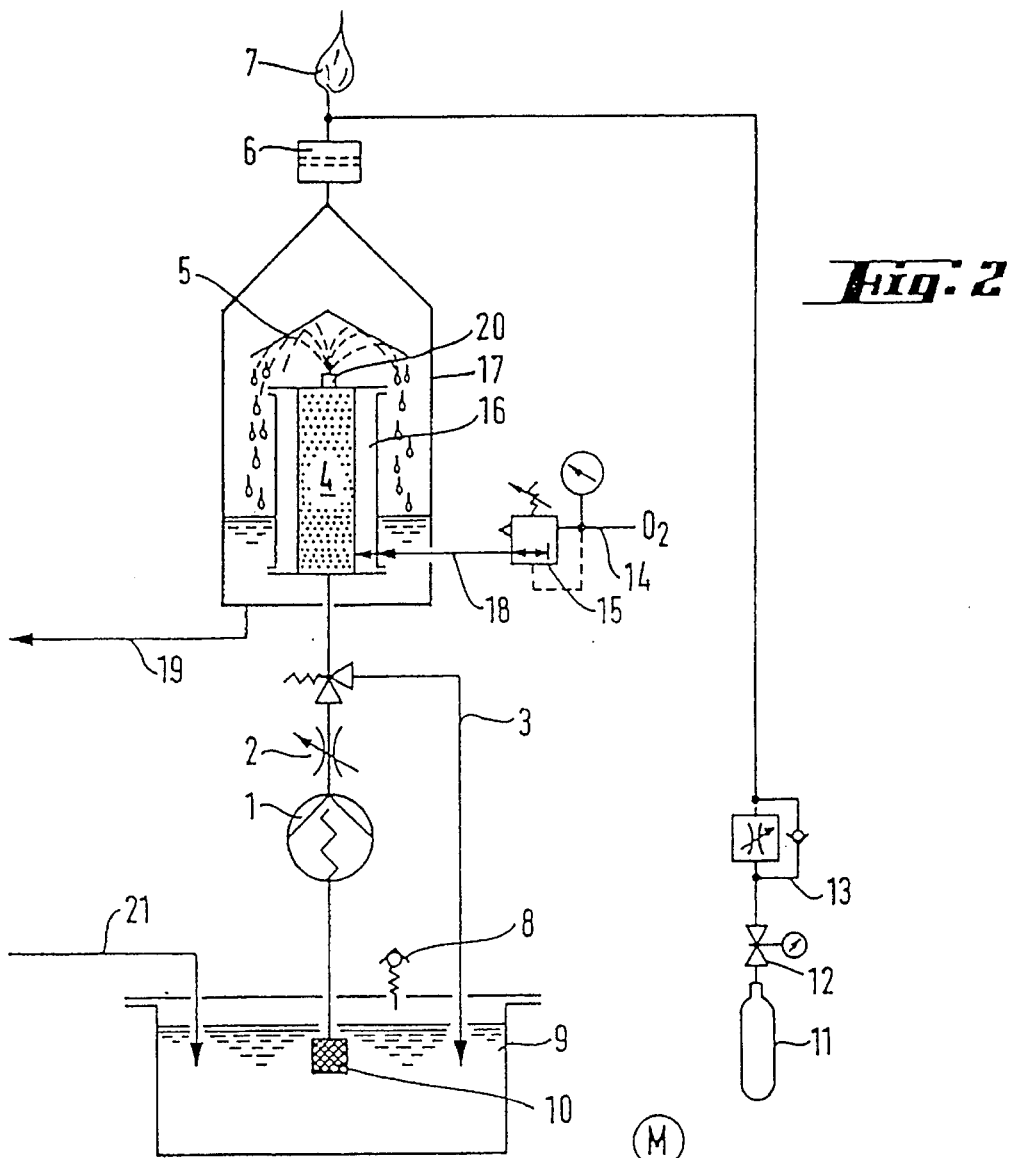
FIG. 2 is a schematic illustration of the method of the invention wherein the free ammonia is not bound, but is disposed together with the other gases resulting from the process and the liquid materials.

Method of FIG. 2

This example displays a simplified version of the method, where the free ammonia is not bound, but is disposed together with the other gases resulting from the process and the liquid materials thermally and/or thermocatalytically. In principle, the method is the same of Example 1, only the procedure of gypsum supplementation to the reaction medium is dropped. The thermal disposal of the gases according to this example produces respectively much more exothermic energy from the combustion. Therefore the utilization of the process heat according to Example 2 would be suitable.

EXAMPLE 3

Method of FIG. 1

This example corresponds to Example 1, only a thick dung processing step is preset the preparation installation. Principally, this can be preset every stationary installation to guarantee a more smooth run of the main process.

The preset installation 50 consists in principal of an overflow container 40 and a mincing piston respectively a grater 41 with a sieve 42. For that purpose different other systems, especially rotating mincing systems, can be used.

EXAMPLE 4

Figure 3:
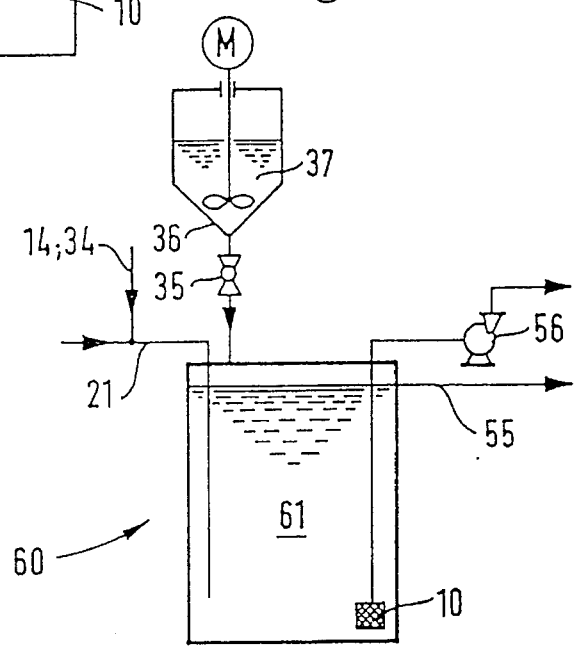
FIG. 3 is a schematic illustration of the method of the invention wherein animal excrement and liquid manure and reactants are prepared in situ.

Method of FIG. 3

This example represents a simplified version of the method, respectively an in sito preparation step. Installation 60 of FIG. 3 is a very simple modification of the ammonia separation from animal excrements. The channel transporting the liquid materials enters vessel 61. Carbon dioxide containing stable exhaust is fed into the liquid materials 14, 34 before they enter vessel 61, or directly into container 61. The gypsum suspension 37 is fed into container 61 via the gypsum suspension dosage 35. The $CaCO_3$-precipitation takes place simultaneously with the formation of ammonium sulfate solubilized in the medium in container 61. The processed liquid materials reach the main storage basin for liquid materials via an overflow pipe, from where they can be distributed on the agricultural soil, or are subject to a further processing according to example 1.

Depending on the proportions of flow and the mixing in container 61 the sedimented material is carried out via overflow pipe 55. If the formation of mud occurs in container 61, it is pumped out using pump 56 and directly used for fertilization, or piled in a storage tank. Alternatively a stirrer is used in container 61. In this cases the processed liquid materials drain off completely via overflow pipe 55.

| Pos. | Designation |
|---|---|
| 1 | eccentric screw pump |
| 2 | pressure-/volume regulation |
| 3 | security overflow |
| 4 | mixing cylinder |
| 5 | baffle plate |
| 6 | flame filter (flame backdraft prevention) |
| 7 | pilot flame |
| 8 | filling indicator |
| 9 | pile container |
| 10 | self cleaning filter |
| 11 | supporting fuel gas |
| 12 | valve |
| 13 | gas volume regulation |
| 14 | air-/$O_2$ inlet |
| 15 | volume regulation for 14 |
| 16 | porous body |
| 17 | reactor |
| 18 | air-/$O_2$ inlet |
| 19 | outlet of processed liquid material |
| 20 | outlet nozzle of mixing cylinder |
| 21 | raw liquid material inlet |
| 22 | oxygen source - stable exhaust |
| 23 | volume regulation for 22 |
| 24 | valve for 22 |
| 25 | |
| 26 | |
| 27 | |
| 28 | |
| 29 | |
| 30 | |
| 31 | |
| 32 | valve 31 stable exhaust |
| 33 | volume regulation for 31 |
| 34 | carbon dioxide inlet |
| 35 | closage of gypsum suspension |
| 36 | mixing vessel for gypsum susp. |
| 37 | |
| 38 | intake stack for 1 |
| 39 | carbon dioxide inlet pipe |
| 40 | overflow vessel |
| 41 | mincing piston, grater |
| 42 | preset sieve |
| 43 | |
| 44 | |
| 45 | |
| 46 | |
| 47 | |
| 48 | |
| 49 | |
| 50 | preset device |
| 51 | |
| 52 | |
| 53 | |
| 54 | |
| 55 | overflow for 60 |
| 56 | mud pump for 60 |
| 57 | |
| 58 | |
| 59 | |
| 60 | preprocessing of gypsum susp. |
| 61 | mixing vessel for 60 |

I claim:
1. Method for producing chemically bound, nonfugitive fertilizer by processing liquid material consisting of animal excrement and liquid manure, said liquid material containing unbound or dissolved ammonia, and for themally degrading the remaining unreacted ammonia, residual methane, and gaseous odorous compounds selected from skatoles and mercaptanes, said method comprising adding to said liquid material gypsum and carbon dioxide whereby said unbound and/or dissolved ammonia contained in the liquid materials is combined with said gypsum, thereby being transformed by a chemical reaction into a nitrogen fertilizer, and the liquid materials are stripped off from the ammonia traces and any volatile substances by passing said gaseous materials through oxygen and then combusting the stripping exhaust thermally, thermal-catalytically or with a fuel gas.

2. Method of claim 1, wherein said processing of the liquid material is carried out by separating the liquid from said liquid material without adding gypsum, the liquid material being treated only with the stripping method.

3. Method of claim 1, wherein said gypsum is in a suspended form with a solid matter content of 5 to 25%.

4. Method of claim 3, wherein said gypsum is used in a suspended form with a solid matter content of 10 to 20%.

5. The method of claim 3 wherein said gypsum is sedimented gypsum from flue gas desulfurization.

6. Method of claims 3 wherein said suspended gypsum is supplied by an eccentric screw pump.

7. Method of claim 1 wherein said carbon dioxide is provided directly from stable exhaust.

8. Method of claim 1, wherein said processing of the liquid material is carried out by separating the ammonia from the liquid manure so that only gypsum and stable exhaust are used to perform the binding reaction of ammonia.

* * * * *